INVENTORS
Robert Staffin
& Robert D. Lohman
BY Charles H. Brown
ATTORNEY

INVENTORS
Robert Staffin
& Robert D. Lohman
BY Charles H. Brown
ATTORNEY

SIGNAL AMPLITUDE QUANTIZER

Filed Dec. 19, 1956 7 Sheets-Sheet 3

INVENTORS
Robert Staffin
& Robert D. Lohman
BY Charles H. Brown
ATTORNEY

INVENTORS
Robert Staffin
& Robert D. Lohman
BY Charles H. Brown
ATTORNEY

Jan. 13, 1959 R. STAFFIN ET AL 2,869,079

SIGNAL AMPLITUDE QUANTIZER

Filed Dec. 19, 1956 7 Sheets-Sheet 5

INVENTORS
Robert Staffin
& Robert D. Lohman
BY Charles H. Brown
ATTORNEY

INVENTORS
Robert Staffin
& Robert D. Lohman
BY Charles H. Brown
ATTORNEY

INVENTORS
Robert Staffin
& Robert D. Lohman
BY Charles H. Brown
ATTORNEY

United States Patent Office
2,869,079
Patented Jan. 13, 1959

2,869,079

SIGNAL AMPLITUDE QUANTIZER

Robert Staffin, Metuchen, and Robert D. Lohman, Princeton, N. J., assignors to Radio Corporation of America, a corporation of Delaware Application December 19, 1956, Serial No. 629,385

12 Claims. (Cl. 332—11)

Figure 1:
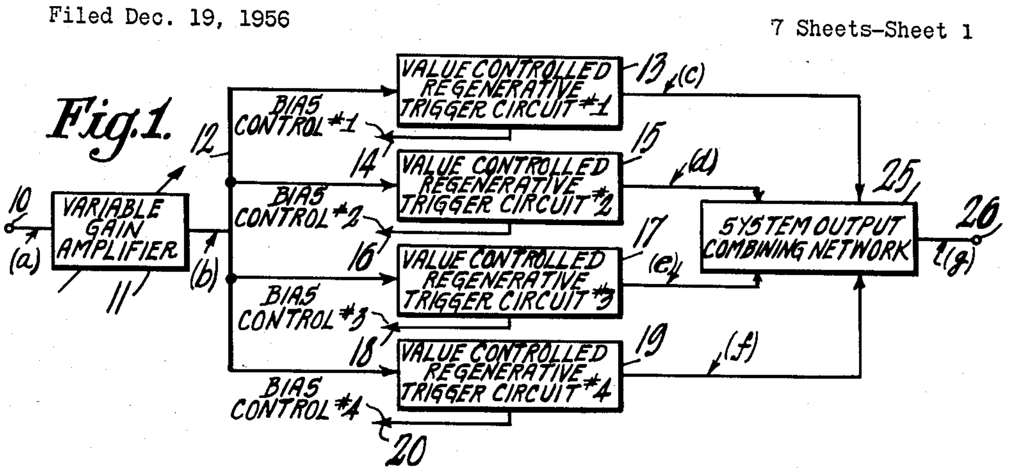

This invention relates to quantizers generally and, in particular, to signal amplitude quantizers utilizing a number of value-controlled regenerative trigger circuits.

A quantizer is a wave conversion device, the output of which exists only in discrete levels. A signal of varying amplitude fed to a quantizer is therein translated or converted to a signal composed of steps of different amplitude values. Thus, the total amplitude range of an input signal may be segmentalized, each segment being represented by a corresponding predetermined level at the output of the device.

Generally speaking, quantizers which have heretofore been proposed have employed mechanical devices, special purpose quantizing electron discharge devices, biased diodes, and vacuum tube or diode limiters. Such known quantizers possess certain disadvantages. Mechanical quantizers are slow. Special purpose electron discharge devices are often experimental in nature. In the case of biased diodes and vacuum tube or diode limiters, the transition time, that is, the time required for the quantized waveform to go from one step to the other may be dependent upon the input signal waveform and therefore produce undesirable sloping edges between steps or levels, rather than desired steep edges. Also, these quantizing devices are capable of "sitting" at some indeterminate position, the output signal being at a level other than one of the discrete level values chosen beforehand.

It is therefore an object of this invention to provide a novel method of and a means for providing a quantized output waveform existing only in predetermined discrete levels independent of the input waveform.

Another object of the invention is to provide a novel method of and a means for quantizing a signal whereby the transition time between quantized levels is extremely rapid and independent of the particular shape of the input waveform.

A further object of this invention is to provide a novel method of and a means for quantizing an input waveform which varies over a wide range of frequencies.

And another object of this invention is to provide a novel method of and a means for obtaining a large number of quantized discrete signal levels from a small number of regenerative trigger circuits.

And yet another object of this invention is to provide a novel method of and improved means for rapidly converting analog type intelligence to digital form.

The above and other objects of the invention are achieved in accordance with one embodiment of the invention by applying the signal to be quantized to a bank of value-controlled regenerative trigger circuits, the input terminals of which are in parallel. The term "value-controlled regenerative trigger circuit" as used herein and in the appended claims is deemed to mean a device which will assume either of two stable states, dependent solely upon the value of the signal placed upon the input electrode (independent of the shape of the signal) with reference to an arbitrarily chosen threshold voltage level or firing potential determined by the bias on the device. This type of circuit is to be distinguished from a pulse-actuated regenerative trigger circuit (sometimes referred to as a "locking circuit") which comprises regeneratively coupled elements. This circuit will conduct in either of two stable states, and will change from one stable state to the other in response to a pulse of a particular polarity and magnitude. The value-controlled device is therefore one wherein the stable state in which the device is resting is uniquely determinable from the value of the input signal. In contradistinction, the conventional pulse-actuated trigger circuit is one in which it is impossible to determine the particular stable state in which it is resting merely from a knowledge of the value of the input signal without a further knowledge of the history of the previous input pulses. In the case of a value-controlled regenerative trigger circuit, when the magnitude of the input signal is below the firing potential, the circuit will conduct in one stable state. When the magnitude or value of the input signal is above the firing potential, the trigger circuit will conduct in the other stable state. A feature of the regenerative trigger circuits employed in the instant invention is the direct coupling in the regenerative cross-coupling connections between the reciproconductive elements, the lack of a timing circuit therein enabling the trigger circuit to operate with a change of steady-state potential.

In the sequential mode of operation these trigger circuits are arranged to change their state of conduction in a predetermined sequence as the amplitude-varying waveform rises in value above the firing potential of each, and to similarly return to their original state of conduction in an inverse sequential order when the input waveform falls below their respective firing potential.

The determination of the firing potential, which when crossed by the input signal to be quantized will cause the regenerative trigger circuit to change from one stable state of conduction to the other, may be accomplished in either of two ways. In one way, each regenerative trigger circuit has a different firing potential. The input signal is applied simultaneously to each trigger circuit, and as the input signal crosses the respective firing potential of each trigger circuit, that circuit will fire, or change state. In the second way, the firing potential for each regenerative trigger circuit is set to an identical value. The D. C. component is removed from thhe input signal to be quantized and the remaining A. C. component is first applied to driver amplifier stages one of which is serially connected to the input of each regenerative trigger circuit. In each respective amplifier stage, a different D. C. component is added to the varying A. C. component of input signal which in effect makes the input signal cross the firing potential of each regenerative trigger circuit at a different value of the input waveform, depending upon the amount of D. C. that is added in each respective driver amplifier circuit. The choice of systems makes no difference as far as results are concerned and the two systems may be considered to be interchangeable.

The outputs of the trigger circuits within the bank are combined to form an output wave existing only in levels of certain discrete steps. Because a regenerative trigger circuit employing recipro-conductive elements inherently conducts in only one of two states, the absolute value of each step or level in the output waveform is equivalent to a combination of output signals from the several regenerative trigger circuits. Although the amplitude of the input waveform determines at which of these predetermined steps the output waveform will exist at any given instant, yet the absolute value of each of the steps is dependent upon the regenerative trigger circuit operating parameters and is independent of the input waveform. For the same reason, the transition time between levels is also independent of the input waveform. The extremely rapid transition time is primarily due to the regenerative cross-coupling between the recipro-conductive elements in each regenerative trigger circuit.

Another embodiment of this invention achieves a large number of quantized discrete signal levels from a small number of regenerative trigger circuits. The mode of operation of the embodiment described previously results in a quantized output signal, the number of levels being equal to one plus the number of regenerative trigger circuits in the system. The present embodiment employs a plurality of banks of regenerative trigger circuits, and the number of levels in the output waveform is equal to the extended product of one plus the number of regenerative trigger circuits in each bank. In other words, where $M+N \ldots +Q$ regenerative trigger circuits are employed, the quantized output waveform would have $(M+1)\ (N+1) \ldots (Q+1)$ levels. Where a large number of quantized steps are desired, this embodiment results in a reduction of stages, simplification of circuitry, reduction of heat generation, and economy.

This embodiment combines a plurality of banks of regenerative trigger circuits in a quantizing system, the circuits within each bank operating in a sequential fashion as previously described. The signal to be quantized is fed to the input of the first of said banks. The quantized output signal from each bank combining network is fed to a system combining network, and is also fed to a subtracter stage associated with that particular bank of regenerative trigger circuits. In the subtracter stage the bank combining network output signal is subtracted from the input signal feeding that bank and the difference fed to the subsequent regenerative trigger-combining network-subtracter stage combination. The first bank acts as a coarse quantizer, translating the input signal into an output waveworm having a number of levels equal to the number of regenerative trigger devices in the bank plus one. The output signal resulting from the first subtracter stage which, in effect, is the difference between each level of quantized output signal of the first bank and the corresponding segment of first bank input signal, will be quantized in the second bank into a number of levels corresponding to one plus the number of regenerative trigger devices in the second bank. Similarly, the output from the second bank combining network is fed to the system combining network, and also to a second or associated subtracter stage where the output signal from the second bank is subtracted from the second bank input signal. Again the difference signal is fed to a subsequent or third bank of trigger circuits where it is quantized into a number of levels corresponding to one plus the number of regenerative trigger circuits in that bank. This of course may be extended to include any number of banks containing a total of $M+N \ldots +Q$ regenerative trigger devices and yielding $(M+1)\ (N+1) \ldots (Q+1)$ steps in the quantized system output waveform. This waveform appears at the output terminal of the system combining network as the combination of the output signals of all the bank combining networks in the system.

Yet another new and novel embodiment of this invention provides an alternative means of obtaining a large number of output levels with a plurality of banks each including a small number of regenerative trigger circuits. The form of the output signal of this embodiment may also be expressed as having $(M+1)\ (N+1) \ldots (Q+1)$ steps for $M+N \ldots +Q$ regenerative trigger circuits. Each regenerative trigger circuit bank, operating as initially described, is coupled with a respective gating matrix. The gating matrix operates to direct signals to preselected output circuits in accordance with the number and position of signals energizing its input circuits. Thus the gating matrix functions to permit the regenerative trigger circuits of the subsequent bank to change their states of conduction in accordance with the excursions of the system input signal, such permission being dependent upon operating conditions in both the previous and subsequent regenerative trigger circuit banks with which the gating matrix is associated. The input signal to be quantized is impressed on the system input terminal which is connected to a subtracter stage feeding a common bus connecting the inputs of all the regenerative trigger circuits in the system. Initially, the subtracter stage, a means for comparing several voltages and presenting their difference at an output terminal, passes the signal undiminished. The waveform appearing on the bus increases in value, triggering the regenerative trigger circuits in the first bank from their first stable to their second stable state of conduction in a sequential fashion as previously described, the output being fed to the system output combining network thru the first bank combining network. However, when the input waveform attains a value above the operating range of the last or highest-biased first bank regenerative trigger circuit, the first gating matrix allows the first regenerative trigger circuit in the second bank to also change its state of conduction from its first to its second stable state. The output of the latter trigger circuit is fed to an adder stage. A signal of the sample amplitude appears at the adder stage output, inasmuch as this is the only signal fed to the adder at this time. The adder output signal is fed to the subtracter network, where it is now subtracted from the input waveform to be quantized, lowering its value sufficiently to return the circuits of the first regenerative trigger circuit bank to their original stable states of conduction so that they may once again trigger in sequence in response to increasing excursions of the input signal. The output of the first trigger circuit of the second bank is also directed to the first gating matrix stage and the system output combining network through the second bank combining network. When the input waveform has triggered all the first bank regenerative trigger circuits including the first trigger circuit of the second bank, the gating matrix stage allows the second trigger circuit of the second bank to change to its second stable state. The output of the second trigger circuit of the second bank is fed to the system output combining network together with that of the first trigger circuit of the second bank thru the second bank combining network. The output of this trigger circuit is also combined in the adder circuit with that of the first second-bank trigger circuit, and the sum fed to the subtracter stage where it is combined with the constantly increasing input waveform, and the resulting difference voltage is once again of sufficient amplitude to bring the input voltage as it appears on the input bus within a range that may be quantized by the first bank, which returns to its initial state. This cycle continues, assuming an input waveform of increasing magnitude, until the last second bank trigger circuit has triggered. Output from this trigger circuit is fed to a succeeding gating matrix, which then functions to allow regenerative trigger circuits in the third or succeeding bank to trigger in accordance with the excursions of the input signal appearing on the common bus. In each instance, the input signal appearing on the bus is the difference voltage between the amplitude of the input signal appearing at the system input terminal, and the sum of the quantized output voltages fed to the adder circuit. Thus, the input signal on the bus never exceeds a certain predetermined level calculated to be just above the operating range of the first trigger circuit bank, which bank is constantly reutilized. The amplitude of the signal at the system output terminal is equal to the sum of the voltages of the output signals from the bank combining networks, which in turn are composed of the output signals of the individual regenerative trigger circuits within each bank. The number of circuits within each bank and the number of banks may be extended to simulate any numbering system of arbitrarily chosen radix. In each case, for $$M+N \ldots +Q$$

regenerative trigger circuits within the system, the output waveform will be quantized to $$(M+1)\ (N+1)\ .\ .\ .\ (Q+1)$$

levels.

The operation of the invention is given in more detail in the following description, taken in conjunction with the accompanying drawings, in which:

Figure 1 is a basic block diagram of a sequential mode $(N+1)$ level quantizer incorporating the principles of this invention.

Figures 2*a*, 2*b*, 2*c*, and 2*d* are charts of voltage waveforms appearing at various points in the circuit of Figure 1.

Figure 3:
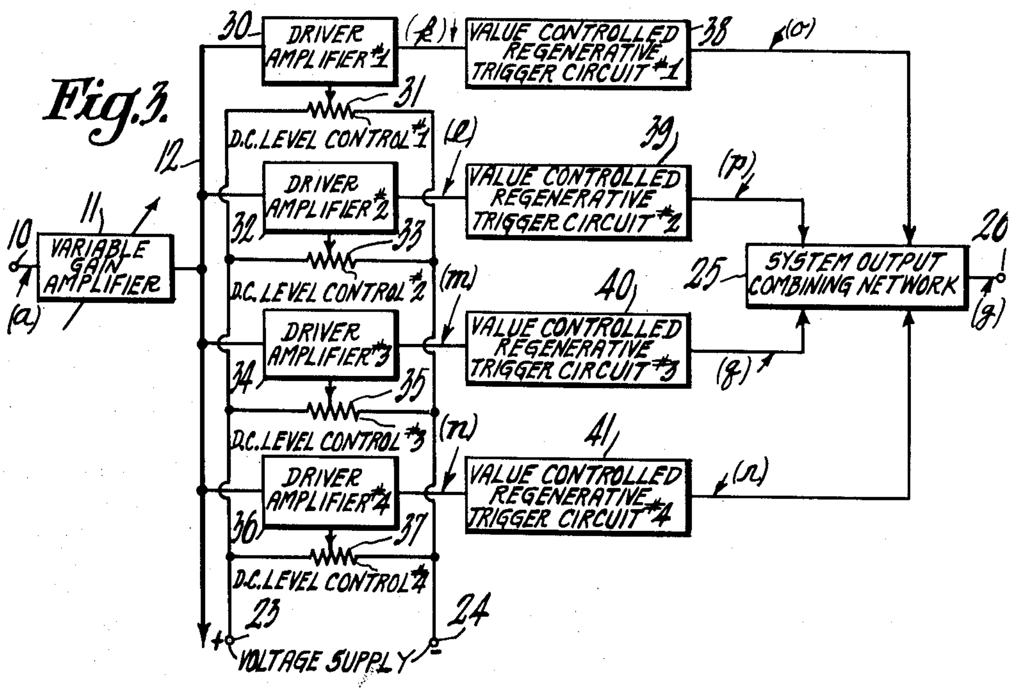

Figure 3 is a basic block diagram of an alternate embodiment of a sequential mode quantizer. The system illustrated employs four regenerative trigger circuits, hence yields five levels.

Figures 4*a* thru 4*d* are charts of voltage waveforms appearing at various points in the circuit of Figure 3.

Figure 5A:
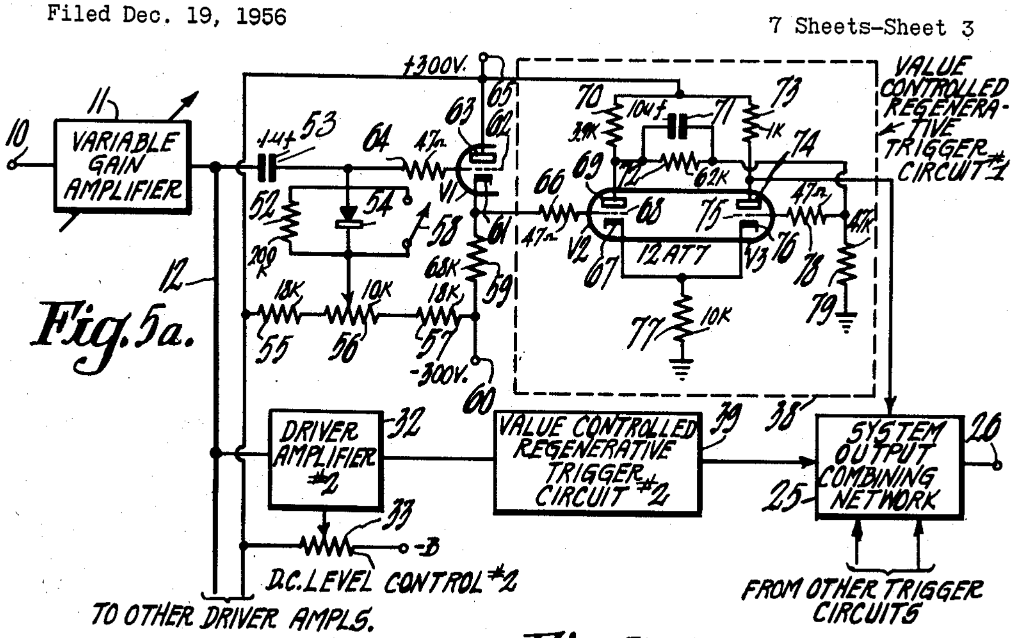
Figure 5B:
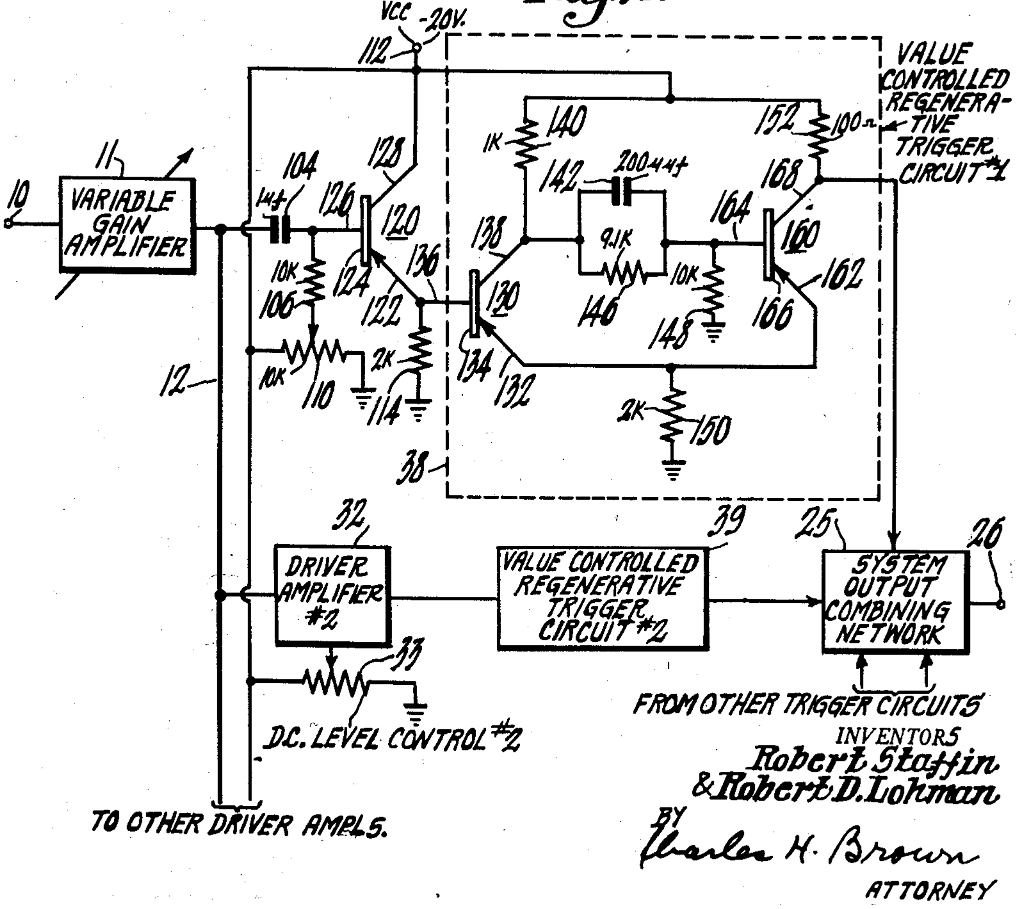

Figure 5*a* is a circuit diagram of the regenerative trigger circuits of Figure 3 employing vacuum tubes. Figure 5*b* is a schematic diagram of an equivalent circuit employing transistors.

Figure 6:
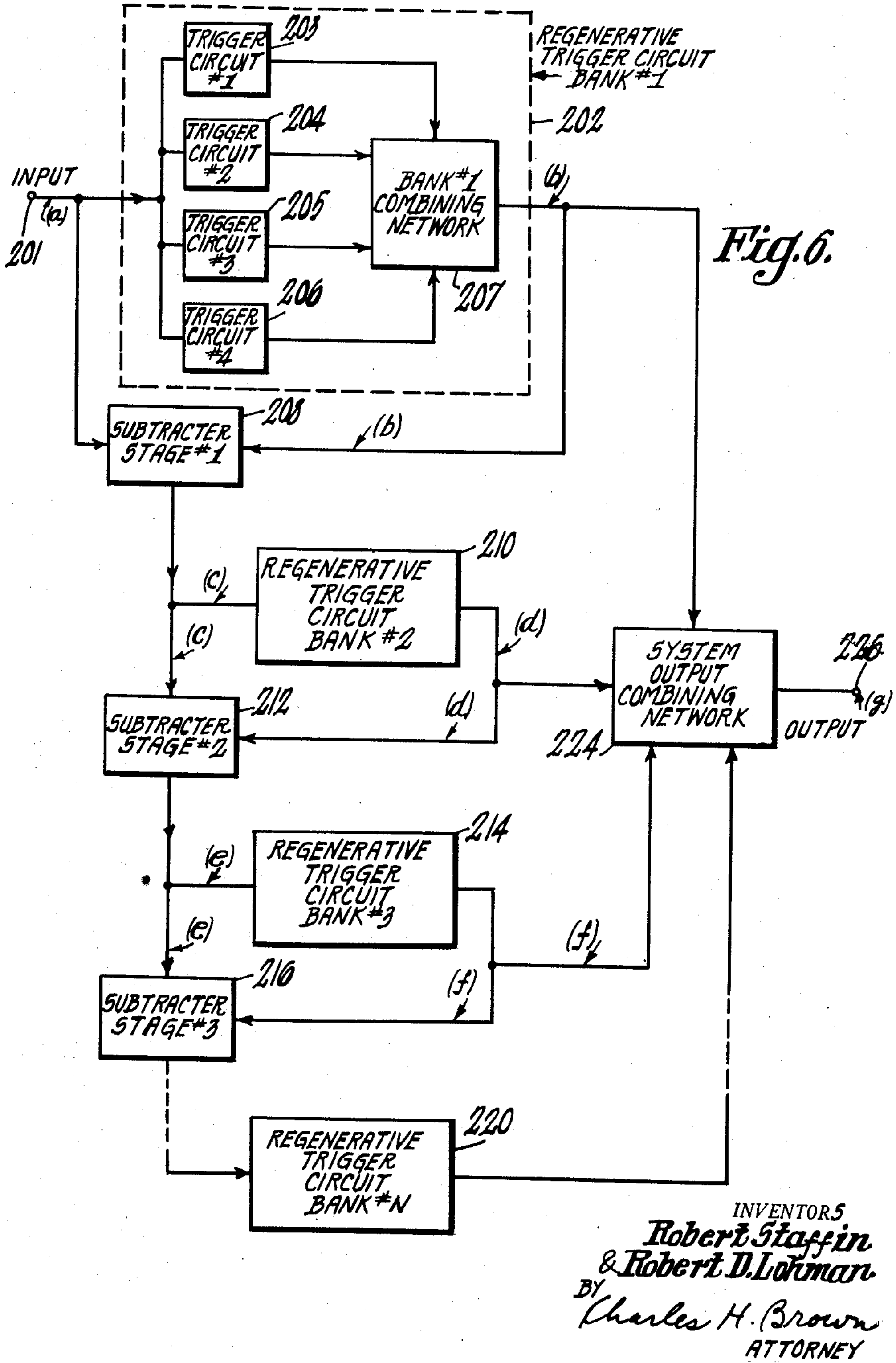

Figure 6 is a basic block diagram of one embodiment of the invention whereby the number of quantized output levels may be increased to the extended product of one plus the number of regenerative trigger circuits in each stage.

Figures 7*a*, 7*b*, 7*c* and 7*d* picture the voltage waveforms at various points in the system of Figure 6 illustrating the principles of operation of this embodiment.

Figure 8:
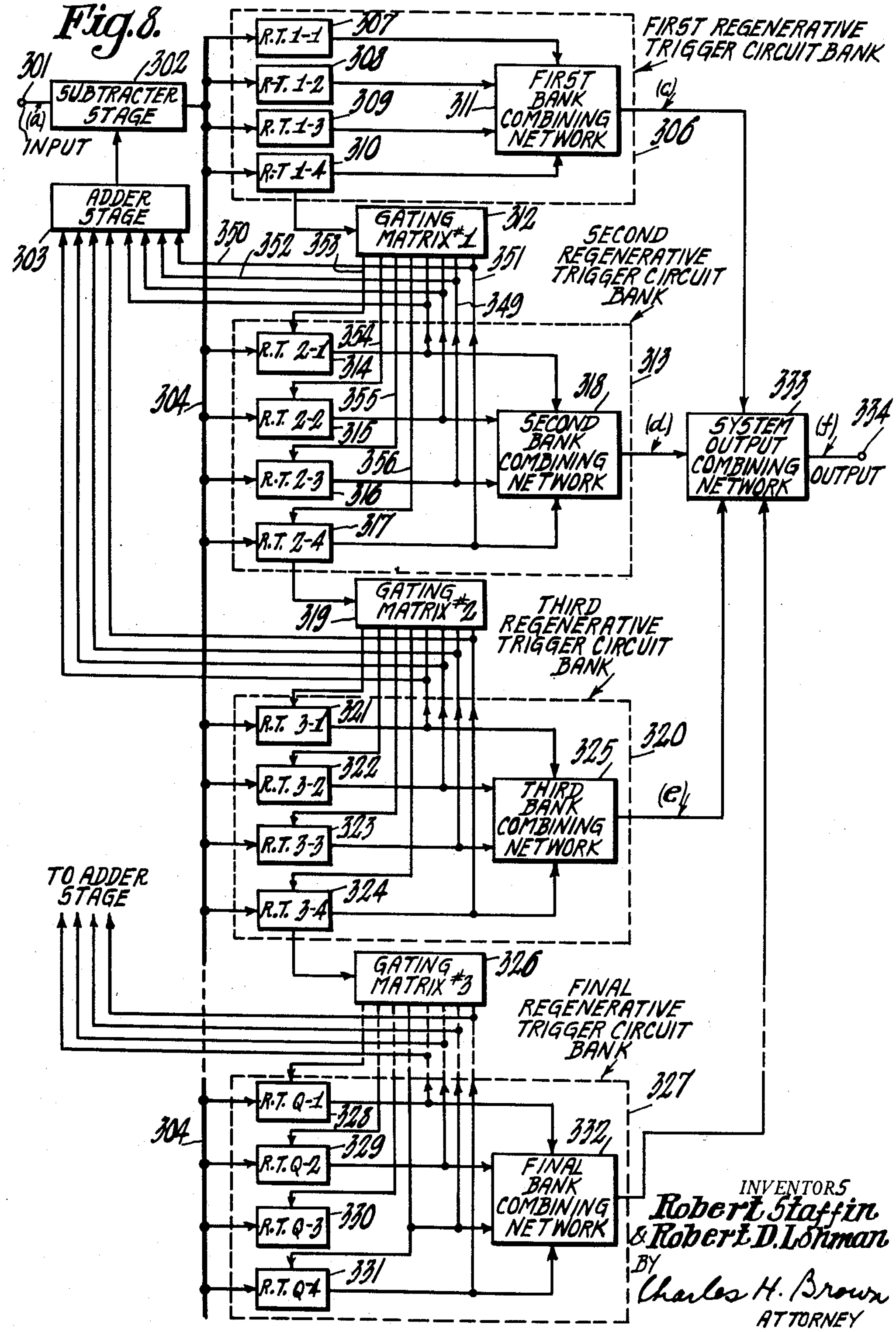

Figure 8 is a basic block diagram of another embodiment whereby the number of quantized output levels may be increased to the extended product of one plus the number of regenerative trigger circuits in each stage.

Figures 9*a* thru 9*f* are charts of the voltage waveforms appearing at various points of Figure 8 and aid in the explanation of the principles of operation of this embodiment.

Figures 9, 10:
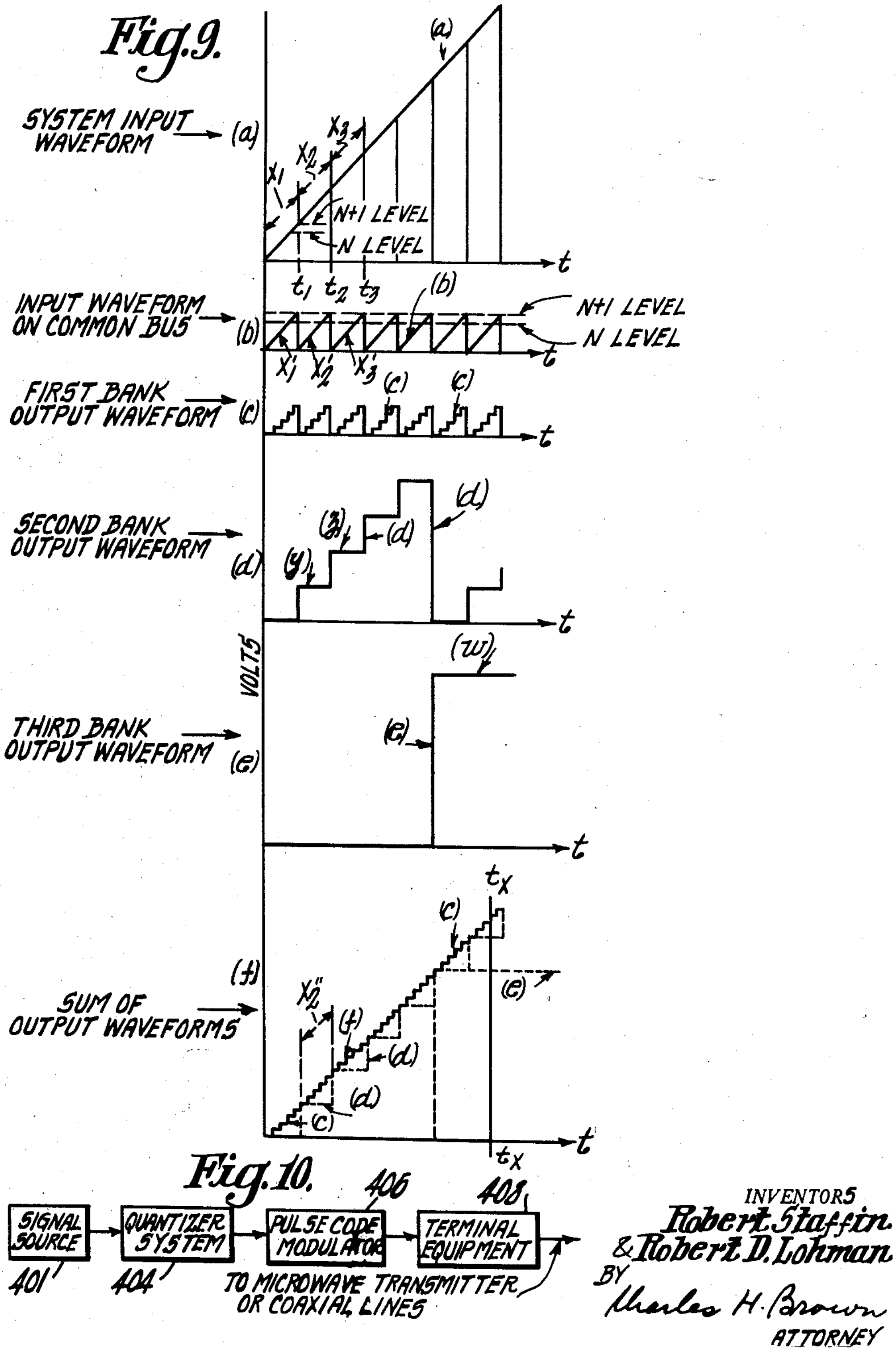

Figure 10 is a block diagram of a Pulse Code Modulation Multiplex System, incorporating the principles of this invention for preparing a continuously varying signal, such as speech, music, or video, for coding.

Reference is made to Figure 1, the basic block diagram of an $(N+1)$ level quantizer incorporating the principles of this invention. The system input terminal 10 is supplied with waves of varying amplitude and is connected to a variable gain amplifier 11, the function of which is to adjust the excursions of the input signal so that the peak-to-peak value of the amplifier output signal will fall within the operating range of the quantizing system. The amplifier 11 is connected to a common bus or connector 12 which connects in parallel the input terminals of the four value-controlled regenerative trigger circuits shown. While the inputs are connected in parallel, their outputs are individually connected to a combining means 25 which has a system output terminal 26. This combining means usually takes the form of an adder network. In its simplest form, an adder network may be merely a junction of all the output plate circuits of the regenerative trigger circuits, and this serves to add the output signals in such a manner that the output steps of the quantized waveform are identical in size. In another common form of adder circuit, the network consists of an identical resistance or impedance element between each of the network input terminals and a common network output terminal, and additionally, a resistance or impedance element from the output terminal to ground. In a corresponding manner, a combining network may be constructed so the output signal appearing at the system output terminal 26 may be composed of unequal steps, the variation depending upon the requirements of the application. A complete discussion of the addition of voltages and currents by both linear passive networks and vacuum tube circuits will be found in chapter 18, Mathematical Operations on Waveforms, pages 629 thru 648, "Waveforms," Chance et al., vol. 19, Radiation Laboratory Series, McGraw-Hill Book Co. Inc., 1949 edition.

Associated with each value-controlled regenerative trigger circuit is a biasing control, the function of which is to predetermine the threshold value of each regenerative trigger circuit, or in other words, the value of input signal appearing at common bus 12 or the input terminals of each trigger circuit that will cause it to trigger.

The regenerative trigger circuit, which is capable of operation only in two stable states, will change from the one stable state to the other stable state as the input signal rises above this threshold or triggering potential. The regenerative trigger circuit will remain in this second stable state as long as the input signal voltage remains above the threshold potential, restoring itself or returning to the original stable state when the amplitude of the input signal voltage falls below the threshold potential for that particular regenerative trigger circuit.

In Figure 1, the amplitude of the signal voltage appearing on the common bus 12 that will cause the first regenerative trigger circuit 13 to change from one stable state to the other stable state is determined by its associated bias control 14. The second regenerative trigger circuit 15 is similarly influenced by its associated bias control 16. The value of input voltage that causes the third regenerative trigger circuit 17 to change its state is predetermined by the setting of the third bias control 18. The same relationship exists between the fourth regenerative trigger circuit 19 and its respective bias control 20. The bias controls in this embodiment are set at successively higher levels, so that the regenerative trigger circuits will fire in a sequential fashion as the input signal progressively increases from its most negative value to its most positive value, and cease conduction in an inverse sequential order as the input signal progressively decreases from its most positive value to its most negative value.

Figure 2:
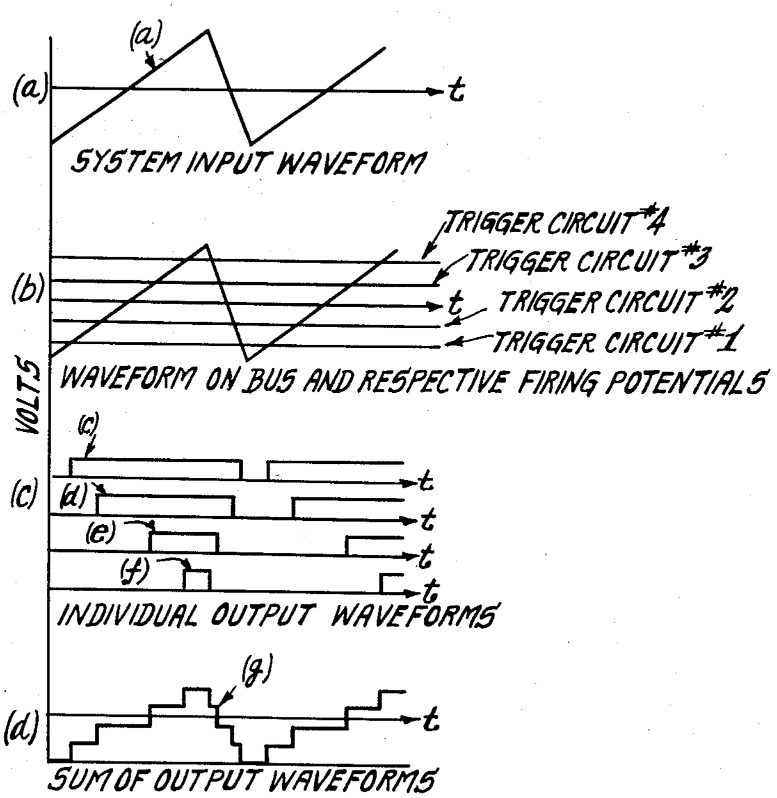

For a description of system operation, reference is made to Figure 2 which shows various waveforms at points in the circuit of Figure 1, identified by corresponding letters.

For purposes of illustration, the waveform impressed on the system input terminal 10 is a linear sawtooth, although the system of this invention is particularly fitted for the quantizing of signals having the waveforms of speech, music, or video. This input waveform, pictured by Figure 2*a*, is fed thru the variable gain amplifier 11, the output of which is connected to the common bus 12, which in turn connects the inputs of the regenerative trigger circuits in parallel relationship. The function of the amplifier 11 is to allow adjustment of the amplitude of the signal to be quantized, as appearing on the common bus 12, to be equal to the operating range of the regenerative trigger circuits.

Figure 2*b* illustrates the output waveform of the amplifier 11 as impressed on the common bus 12 in relation to the triggering potentials of the regenerative trigger circuits of this embodiment. When the input signal is at its most negative excursion, all of the regenerative trigger circuits are in their original stable state which will hence forth be referred to as their "zero" state. As the input waveform of Figure 2*a* rises, the waveform of Figure 2*b* will similarly rise, crossing the triggering potential of the first regenerative trigger circuit 13, pictured in Figure 2*b*. This will cause the first regenerative trigger circuit 13 to change fom its originally stable state to its second stable state, henceforth referred to as the "one" state, and the output of this trigger circuit as seen on lead (*c*) of Figure 1 is shown by corresponding waveform (*c*) of Figure 2*c*. As the input waveform continues to increase in value, the triggering threshold of the second regenerative trigger circuit 15 is crossed, causing this trigger circuit to change from its "zero" state to its "one" state, The change in voltage on lead (*d*) of Figure 1 caused thereby is shown by waveform (*d*) of Figure 2*c*. Similarly, further increase in the input signal causes the third regenerative trigger circuit 17 and fourth regenerative trigger circuit 19 to change sequentially from their "zero" stable states to their "one" states, and corresponding output voltage changes for these circuits appearing on output leads (*e*) and (*f*) of Figure 1 are shown by the corresponding designated waveforms in Figure 2*c*.

Since these regenerative trigger circuits remain in their "one" state only as long as the input signal remains above their respective triggering potential as determined by their respective bias control, a decrease in input signal will allow each regenerative trigger circuit to return to its original "zero" state as the value of the input signal falls below the respective firing potential. This condition is indicated in Figure 2*c* by the sequential cessation of the regenerative trigger output signals on waveform charts (*c*) through (*f*).

The individual output waveforms as illustrated in Figure 2*c* are directed to a combining means 25, the resulting system output signal appearing at system output terminal 26 or lead (*g*) of the circuit of Figure 1. This resulting quantized output waveform is pictured by Figure 2*d*.

Figure 3 is a block diagram of an alternate embodiment of a 5 level quantizer. In the system illustrated, the output waveform has five levels. This embodiment differs from that disclosed in Figure 1 only in one material respect. In Figure 1, the regenerative trigger circuits were adjusted to have different firing potentials, and as the system input waveform became more negative or positive, crossing the firing potential of each trigger circuit caused it to change from one stable state to the other. In the instant embodiment, each trigger circuit is adjusted to have the same firing potential. The system input waveform as fed to each trigger circuit, however, has its D. C. component removed, and a different amount of D. C. is substituted in the waveform as it appears at the input of each trigger circuit. Thus, as the system input waveform becomes more negative or positive, it will cross the firing potentials of the respective trigger circuits at different values of the input wave.

As in Figure 1, the system input terminal 10 is supplied with waves of varying amplitude and is connected to a variable gain amplifier 11, the function of which is to adjust the excursions of the input signal so that the peak-to-peak value of the amplifier output signal will fall within the operating range of the quantizing system. The amplifier 11 is connected to a common bus or connector 12 which connects in parallel the input terminals of the four system branches, each containing a driver amplifier-D. C. level control serially connected to a value-controlled regenerative trigger circuit. The function of the driver amplifier-D.C. level control combination is to adjust the D. C. value of the input waveform independently for each regenerative trigger circuit. Although the regenerative trigger circuits of this embodiment are designed to trigger at the same D. C. grid voltage, addition of a different D. C. component to the input waveform on each system branch will cause each respective trigger circuit to trigger at a different point on the input waveform. A D. C. voltage from an external unidirectional source (not shown) is applied to the voltage supply terminals 23 and 24 which in turn parallel-connect the adjustable D. C. level control 31 associated with the first driver amplifier 30, the second adjustable D. C. level control 33 associated with the second driver amplifier 32, the third adjustable D. C. level control 35 associated with the third driver amplifier 34, and the fourth or *n*th adjustable D. C. level control 37 which is associated with the corresponding driver amplifier 36. Each D. C. level control is in turn connected to its associated amplifier and the output of each amplifier is connected to the corresponding value-controlled regenerative trigger circuit. There is thus a connection from the output of the first driver amplifier 30 to the input of the first value-controlled regenerative trigger circuit 38. The output of the second driver amplifier 32 is connected to the second regenerative trigger circuit 39 and the output of the third driver amplifier 34 is connected to the third regenerative trigger circuit 40. Similarly, the output of the fourth or *n*th driver amplifier 36 is fed to the input of the corresponding regenerative trigger circuit 41. The outputs of all of the regenerative trigger circuits are individually connected to a system output combining network 25 which has a system output terminal 26. The structure and function of this combining means has previously been described in connection with Figure 1.

Figure 4:
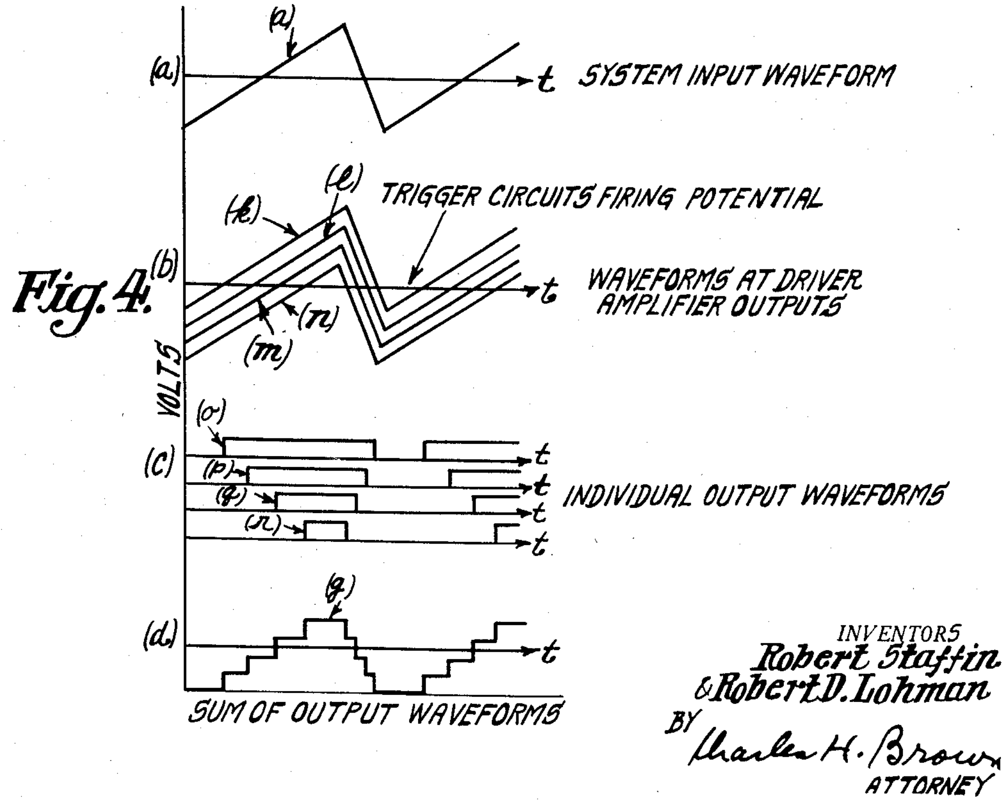

For a description of system operation, reference is made to Figure 4, which illustrates the various waveforms at leads in the circuit of Figure 3, identified by corresponding letters.

Assuming the input waveform impressed on the input terminal 10 to be a linear sawtooth as shown in Figure 2*a*, it is fed thru the variable gain amplifier 11 where the peak-to-peak amplitude as it appears on the common bus 12 is adjusted to correspond to the operating range of the quantizing system. This adjusted waveform is then simultaneously impressed upon the inputs of each of the driver amplifiers in the system via the common bus 12.

Within each driver amplifier the D. C. component is removed from the input signal and a predetermined D. C. value substituted, dependent upon the adjustment of the associated D. C. level control. The D. C. level of the input signal appearing at the output of each driver amplifier will be different in each case in relation to the firing potential of the subsequent regenerative trigger circuit. Each regenerative trigger circuit will therefore trigger at a different point on the input waveform. The waveform as it appears at the outputs of the several driver amplifiers, with different values of D. C. component added, is illustrated in Figure 4*b*. The waveforms appearing at the outputs of the first amplifier 30, the second amplifier 32, the third amplifier 34, and the fourth amplifier 36 are identified in Figure 4*b* by the letters (*k*), (*l*), (*m*), and (*n*), respectively. As the input waveform becomes more positive it is seen that the output signals of the several amplifiers cross the firing potential of their associated trigger circuits in a sequential order. The output signals of the first trigger circuit 38, the second trigger circuit 39, the third trigger circuit 40, and the fourth trigger circuit 41 are identified in Figure 4*c* by waveforms designated (*o*), (*p*), (*q*) and (*r*) respectively. The combination of these output waveforms as appearing at the system output terminal 26 is illustrated by waveform (*g*) of Figure 4*d*.

Figure 5*a* is a schematic diagram of the first regenerative trigger circuit of Figure 3. Details of the D. C. biasing arrangement permitting value-triggering of this circuit are included. Since the regenerative trigger circuits of this embodiment are identical in construction, the details of construction and operation of only the first stage are presented. Essentially, the circuit consists of a driving amplifier-D. C. level control configuration connected to a cathode coupled multivibrator, all elements being well known in the art.

The signal to be quantized is impressed across the input terminal 10 and a point of reference potential, which in this case is ground, and is coupled to the variable gain amplifier 11. The output of the amplifier 11 is a waveform of a shape identical to that of the input signal. The amplitude, however, is adjusted so the peak-to-peak value corresponds to the operating range of the bank of regenerative trigger circuits 38, 39, 40, etc. A common bus 12 is connected between the variable gain amplifier 11 and the inputs of all the regenerative trigger circuits. The signal appearing on the bus 12 is impressed on the grid electrode 62 of driver amplifier tube $V_1$ thru a coupling capacitor 53 and a suppressor resistor 64 which are serially connected between the bus 12 and the grid electrode 62. The function of the suppressor resistor 64 is to prevent parasitic oscillations and in many instances is unnecessary. Such use is optional and constitutes no part of the invention disclosed herein.

The plate electrode 63 of amplifier tube $V_1$ is coupled directly to the B plus terminal 65 while the cathode electrode 61 is connected to the B minus terminal 60 thru a cathode resistor 59. The capacitor 53 is a D. C. blocking condenser and serves to strip off any D. C. component of the signal that may be present at the bus 12 which feeds the driving amplifier grid electrode 62. The remaining A. C. component of the input signal is combined with an arbitrary D. C. level determined by the D. C. setter configuration and the setting of the potentiometer 56, and the resultant signal to be quantized is applied to the grid 62.

The D. C. setter configuration comprises a coupling capacitor 53, a diode 54, a diode shunting resistance 52, and a bias control potentiometer 56. The diode 54 is connected from a point between the capacitor 53 and the suppressor resistor 64 to the slider arm or variable tap of the bias control potentiometer 56. The diode 54 is shunted by a single pole-single throw shorting switch 58, and the diode shunting resistance 52. The bias control potentiometer 56 is connected serially between a first resistor 55 and a second resistor 57, the former running to the B plus terminal 65 and the latter running to the B minus terminal 60. The three resistances constitute a voltage dividing network, and the position of the slider arm on potentiometer 56 determines the D. C. voltage applied to the grid electrode 62 in combination with the varying component of the input signal.

For signals where the D. C. value has no meaning, such as music and other audio waveforms, the quantizer is operated with the diode shorting switch 58 closed. In such an arrangement, normal potentiometer bias control is obtained. The D. C. value to be added to the input signal applied to the first value-controlled trigger circuit 38 is chosen and set by potentiometer 56 adjustment, and the input signal varies above and below this D. C. voltage.

Where the signal to be quantized is of such a nature that the D. C. level assumes significance, as in the case of a video signal where the level determines the average brightness of the signal, the diode shorting switch 58 is left open. The D. C. setter sub-circuit then establishes the level of the input signal at the instant of its peak value and thereby determines the value at which the original waveform is quantized. A complete discussion of the principles of D. C. restoration or reinsertion will be found on pages 644 thru 647, "Electronic and Radio Engineering," Terman, fourth edition, McGraw-Hill Book Co., Inc.

Assuming operation with the diode shorting switch 58 in a closed position, the waveform appearing at the grid electrode 62 is essentially the same as that at the grid bus 12 differing only by the D. C. value inserted by the setting of bias control 56. Tube $V_1$ functions as a cathode-follower amplifier, that is, as a single stage amplifier in which the output voltage is taken across the cathode resistor 59. Since tube $V_1$ functions as a cathode-follower, the waveform at the cathode electrode 61 also varies about the D. C. value, the latter being determined by the setting of the bias control 56. Operation of a cathode-follower amplifier is fully described on pages 114 thru 118 of "Cathode Ray Tube Displays," Soller et al., vol. 22, Radiation Laboratory Series, McGraw-Hill Book Co., Inc. 1948 edition.

The waveform at the cathode 61 of the cathode-follower driver amplifier tube $V_1$ is impressed thru a suppressor resistor 66 on the grid electrode 68 of tube $V_2$. Tube $V_2$ is the first tube of a two tube cathode-coupled multivibrator circuit possessing two stable states. The operation and construction of the multivibrator employed in this embodiment is described on pages 165 and 166 of "Waveforms," Chance et al., vol. 19, Radiation Laboratory Series, McGraw-Hill Book Co., Inc., 1949 edition. It is of the form popularly known as a "Schmitt trigger circuit." Essentially it consists of two triodes having direct regenerative cross-couplings. One of these couplings is a resistance coupling, devoid of timing capacitance, between the plate of the first tube and the grid of the second, while the other coupling is a common cathode resistance. Since such a device has no timing circuit, it operates with a change of steady input potential. The circuit triggers in one direction when the input potential is raised to a critical value and triggers in the reverse direction when the input is reduced to another level. As a practical matter, the two levels are made practically identical by circuit design. In the circuit illustrated, this "hysteresis" effect has been reduced to an insignificant factor by choice of circuit components, and thus the regenerative trigger circuit may be considered to have an identical firing potential at which it triggers from one stable state to the other, and vice-versa. The plate electrode 69 of tube $V_2$ is regeneratively cross-coupled to the grid electrode 75 of tube $V_3$ by a coupling resistor 72 shunted by a capacitor 71, the function of which is to shorten the transition time from one conducting state to the other. A suppressor resistor 78 is serially connected between the coupling resistor 72 and the grid electrode 75 of the tube $V_3$. A plate load resistance 70 couples the plate electrode 69 of tube $V_2$ to the B plus terminal 65, while a second plate load resistor 73 couples the plate electrode 74 of tube $V_3$ to the B plus terminal 65. The cathode electrode 67 of tube $V_2$ is directly connected to the cathode electrode 76 of tube $V_3$, both being coupled to ground thru cathode resistor 77. A biasing resistor 79 couples grid electrode 75 of tube $V_3$ to ground while the plate electrode 74 is directly connected to the combining means 25.

The direct regenerative coupling characteristic of the connection between the cathode electrode 67 of tube $V_2$ and the cathode electrode 76 of tube $V_3$, in combination with the resistance coupling the plate electrode 69 of tube $V_2$ to the $V_3$ grid electrode 75 results in extremely rapid transition time between the two stable states of operation. It is this feature of the regenerative trigger circuits employed in this invention that provides a quantized system output signal wherein the transition time between quantized levels is extremely rapid and independent of the shape of the input waveform. The circuit employed in the instant embodiment is capable of assuming only two states of operation. As long as the variable signal voltage impressed on grid electrode 68 of $V_2$ is more negative than the predetermined threshold value, tube $V_2$ is non-conducting, tube $V_3$ is conducting and the amplitude of the plate current flowing in the latter tube is independent of the amplitude-varying input signal voltage. This state will be referred to as the "zero" state. The output voltage then appearing at plate electrode 74 of tube $V_3$ is fed to the combining means 25, representing the "zero" state of operation. As the input signal on $V_2$ grid electrode 68 rises above the critical or threshold bias value, tube $V_2$ begins to conduct. There follows a rapid and violent transition resulting in tube $V_2$ conducting and tube $V_3$ being non-conductive. This state will be referred to as the "one" state. Further positive excursions of the input signal result in plate current changes in tube $V_2$ but the plate current in tube $V_3$ remains cut-off and maximum voltage appearing on plate electrode 74 of tube $V_3$ is fed to the combining means 25, representing the "one" state of operation. It is seen that the amplitude of the signal fed to the combining means 25 in the "one" state of operation is still independent of the input signal. Should the signal input voltage on grid electrode 68 of tube $V_2$ drop below the firing threshold bias voltage, the regenerative trigger circuit will restore itself or return to its original or "zero" state and the change will be reflected as the reappearance of the original output level at the combining means 25. Assuming no other regenerative trigger circuits are in operation, this will be the signal appearing at the system output terminal 26. It is this characteristic whereby the output of the circuit may exist only at one of two predetermined levels, irrespective of the waveform of the input signal, that gives to the instant invention the feature that the absolute value of each of the levels of the quantized output waveform is independent of the waveform to be quantized.

Additional regenerative trigger circuits, including driver amplifier and D. C. bias setting controls, comprise the remainder of the quantizing system. The inputs of each are tied to the common bus 12, while their outputs are connected directly to the combining means 25. By differing adjustments of the D. C. level of each stage, arrangement is made to cause the regenerative trigger circuits to undergo their respective transitions at different or sequential values of the input waveform, as illustrated in Figure 4.

Figure 5*b* is a schematic diagram of the regenerative trigger circuit of the instant invention wherein the reciproconductive elements of the circuit are semi-conductive devices known as transistors. In this embodiment, each device comprises a semi-conductive body having a base electrode, an emitter electrode, and a collector electrode in contact therewith. The semi-conductive body may consist, for example, of a germanium or silicon crystal. The base electrode is in low resistance contact with the crystal and may, for example, be a large-area electrode. The emitter and collector electrodes are in rectifying contact with the crystal and may consist of point electrodes, line electrodes or even large-area electrodes. For operation as an amplifier, a bias in the forward direction is impressed between emitter and base while a bias voltage in the reverse direction is applied between collector and base. Assuming the crystal is of the PNP junction type, the emitter should be positive with respect to the base while the collector should be negative with respect to the base. If the crystal is of the NPN junction type the potentials must be reversed. The circuit illustrated in Figure 5*b* employs PNP junction type transistors, although NPN junction type may be used, providing the polarity of the biasing voltage is reversed.

The circuit consists of a transistor driver amplifier connected to a transistorized "Schmitt trigger circuit" and is identical in function and purpose with the vacuum tube version shown by Figure 5*a*. Where system elements are identical to those of Figure 5*a*, identical designating numerals are used.

For explanatory purposes, it will be assumed that a sawtooth signal to be quantized is impressed across the system input terminal 10 and a point of reference potential, and coupled to the variable gain amplifier 11. Although the output waveform of the amplifier 11 is identical to the input signal, the amplitude is adjusted so that the peak-to-peak value corresponds to the operating range of the bank of regenerative trigger circuits in the quantizing system. A common bus 12 is connected between the variable gain amplifier 11 and the inputs of all the regenerative trigger circuits. The signal appearing on the bus 12 is impressed on the base electrode 126 of the first transistor 120, which comprises additionally a semiconducting body 124 as well as a collector electrode 128 and an emitter electrode 122, thru a coupling capacitor 104. The driver amplifier utilizes transistor 120 in an emitter-follower or common collector amplifier circuit.

The collector electrode 128 of the transistor 120 is connected to the power supply terminal 112 while the emitter electrode 122 is connected to ground thru an emitter resistor 114. Inasmuch as a negative voltage is applied to the power supply terminal 112, the emitter electrode 122 is positive with respect to the base electrode 126, while the collector electrode 128 is negative with respect to the base 126. A variable potentiometer 110 is connected between the power supply terminal 112 and ground. An intermediate point of the potentiometer 110 is connected thru a resistor 106 to the base electrode 126. The capacitor 104 serves to strip off any D. C. component of the input signal as it appears on the bus 12 as fed to the base electrode 126. The remaining A. C. component is combined with an arbitrary D. C. level determined by the setting of the potentiometer 110, and the resultant signal is applied to the base electrode 126. A D. C. setter circuit using a diode may be employed here as shown in Figure 5*a*, for quantizing applications where the absolute D. C. level is of importance. Such circuitry is omitted from Figure 5*b* in the interest of simplicity. The waveform appearing at the transistor base 126 is essentially the same as that at the common bus 12 differing only by the D. C. value inserted by the setting of the bias control 110. The transistor 120 functions as an emitter-follower amplifier, that is, as a single-stage amplifier in which the output voltage is taken across the emitter resistor 114. Since the transistor 120 functions as an emitter-follower, the waveform at the emitter electrode 122 also varies about the D. C. value, the latter being determined by the setting of the bias control 110. The theory of operation of an emitter-follower or common collector amplifier is fully described on pages 91 thru 93 of "Transistor Electronics," Lo et al., Prentice-Hall Inc., 1955 edition.

The waveform at emitter electrode 122 is impressed on the base electrode 136 of the second transistor 130, which is the input of the sub-circuit comprising two recipro-conductive semi-conductor elements regeneratively cross-coupled to change from one stable state to a second stable state of conduction when the input voltage crosses the triggering threshold. The point on the system input wave where this occurs is determined by the D. C. component added to the signal appearing on the base electrode 136 as determined by the setting of potentiometer 110. The second transistor 130 comprises a semi-conductive body 134, a base electrode 136, a collector electrode 138, and an emitter electrode 132. The collector electrode 138 is connected to a collector load resistance 140 which in turn is directly connected to the bias supply terminal 112. The collector electrode 138 is cross-coupled to the base electrode 164 of transistor 160 by a coupling resistor 146 which is shunted by a capacitor 142, the function of the capacitor 142 being to shorten the transition time from one conducting state to the other. Transistor 160 comprises a semi-conductive body 166, a base electrode 164, a collector electrode 168, and an emitter electrode 162. A biasing resistor 148 couples the base electrode 164 to ground. The emitter electrode 162 is connected directly to the emitter electrode 132 and both are connected to ground thru the common emitter resistor 150. The collector 168 is connected to the bias terminal 112 thru a collector load resistor 152. The regenerative trigger circuit output signal is taken from the collector 168, a direct connection being made from it to the network combining means 25, where the output signal will be a part of the system output signal appearing at the system output terminal 26. As with the vacuum tube circuit of Figure 5*a*, it is the regenerative coupling characteristic of the direct connections between the emitter electrodes of the two recipro-conductive elements and the D. C. cross-coupling between the collector electrode 138 and the base electrode 164 which results in rapid transition between the two stable states.

Assuming that the input signal is a negative-going sawtooth and is at its most positive excursion, the transistor 130 will be cut-off and transistor 160 will be conducting. This represents the "zero" state for this circuit and the output voltage, taken from the collector electrode 168 of transistor 160, is at its initial output level. Base electrode 136 is biased positively with respect to emitter electrode 132, the value being dependent upon the setting of bias control potentiometer 110. As the input sawtooth progresses in a negative direction, a point is reached where the base electrode 136 becomes more negative than the emitter electrode 132, said threshold point or value being determined by the setting of bias control potentiometer 110. Transistor 130 will then begin to conduct. The resulting current flow thru the collector load resistor 140 will cause a voltage drop to appear at the collector electrode 138. This positive voltage drop is coupled thru the regenerative cross-coupling resistor 146 and the capacitor 142 to the base electrode 164 of transistor 160, and is of such a polarity as to cause transistor 160 to decrease conduction. As transistor 160 decreases its conduction, it contributes less to the voltage drop across the common emitter resistor 150. This causes transistor 130 to conduct even harder and the violent regenerative action continues until transistor 130 is fully conducting and transistor 160 is cut-off. The circuit output voltage as taken from the collector electrode 168 is now representative of the "one" state of conduction. As long as the signal voltage on the base electrode 136 remains more negative than the threshold voltage, the recipro-conductive devices will remain in this "one" state of conduction. When the input voltage becomes more positive than this threshold value, the regenerative trigger circuit will return to its original stable state. As in the circuitry described in conjunction with Figure 5*a*, the circuit parameters have been chosen so that the threshold value at which the circuit will go from the "zero" to the "one" state is practically identical to the value determining when the circuit will go from the "one" to the "zero" state. Additional stages of identical circuitry may be added, and the number of output levels to be realized will be equal to the number of regenerative trigger circuits plus one.

Five level (four regenerative trigger circuits) and eleven level (ten regenerative trigger circuits) embodiments of this sequential mode of operation have been constructed and successfully operated. They were found to be capable of quantizing various types of input waves including sine waves higher in frequency than four megacycles (mc.) per second, the transition time between output steps being as rapid as forty milli-microseconds, or .04 microseconds.

Figure 6 is a basic block diagram of an alternate embodiment of this invention whereby quantizing of an amplitude-varying input signal may be achieved thru the utilization of a small number of regenerative trigger circuits. In the first embodiment, the number of discrete levels in the quantized output wave was directly dependent upon the number of regenerative trigger circuits employed. The instant embodiment provides a number of levels equal to the extended product of one plus the number of regenerative trigger circuits in each stage. In other words, for $M+N \ldots +Q$ regenerative trigger circuits, there will result a quantized output signal containing $(M+1)(N+1) \ldots (Q+1)$ levels.

An input terminal 201 connects to the inputs of a bank of regenerative trigger circuits 202. In the embodiment illustrated this bank contains four regenerative trigger circuits 203, 204, 205, 206, although the number contained therein is dependent only upon the number of levels desired in the quantized signal output. Each regenerative trigger circuit is identical to that disclosed in Figures 5*a* or 5*b*. Similarly, they are individually arranged so each will change from its first stable state of operation to its second stable state at different values of the input amplitude-varying signal. These triggering values are chosen so that the range over which the first bank of regenerative trigger circuits will change state will cover the full peak-to-peak range of the amplitude-varying input signal to be quantized. These trigger circuits are arranged to change state in a sequential fashion as the signal to be quantized, as it appears at the trigger circuit input, increases in value above the firing threshold of each. Conversely, they return to their original stable state in an inverse sequential fashion as the input signal falls below the firing threshold of each regenerative trigger circuit. The output of each of the trigger circuits is connected to a bank combining network 207. This combining stage may take the form of an adder network as described in connection with Figure 1. The first bank combining network 207 is connected to both a system output combining network 224 and a first subtracter stage 208. The system output combining network 224 is similarly an adder circuit to which is connected the output of each one of the regenerative trigger circuit banks in the system. The combined signal from all the banks thus appears at the system output terminal 226 which is connected to the system output combining network 224.

The first subtracter stage 208 is essentially an adder stage with an inverting element within one of its input circuits causing the signal output to be a voltage difference rather than a sum. A complete discussion of both adder and subtracter networks is found in chapter 18, "Mathematical Operations on Waveforms," pages 629 thru 648, "Waveforms," Chance et al., vol. 19, Radiation Laboratory Series, McGraw-Hill Book Co. Inc., 1949 edition. The system input terminal 201 also connects to the input of subtracter stage 208 and the subtracter output connects to the input terminals of a second regenerative trigger circuit bank 210 and a second subtracter stage 212. The second regenerative trigger circuit bank 210 contains elements identical to those contained within the first regenerative trigger circuit bank 202, including a bank combining network described above. The output of the second bank 210 connects to both the system output combining network 224 and to the second subtracter stage 212. Similarly, the output of the second subtracter stage 212 is connected to the inputs of both the third regenerative trigger circuit bank 214 and the third subtracter stage 216. The output of the third regenerative trigger circuit bank 214, the circuitry being identical to that of the first regenerative trigger circuit bank 202 including the bank combining network 207, is connected both to the system output combining network 224 and the input of the third subtracter stage 216.

The circuitry of the system is repetitive in nature, the input of the *n*th regenerative trigger circuit bank 220 being connected to the output of the previous subtracter stage, while the bank output is connected to the output combining network 224.

Figure 7:
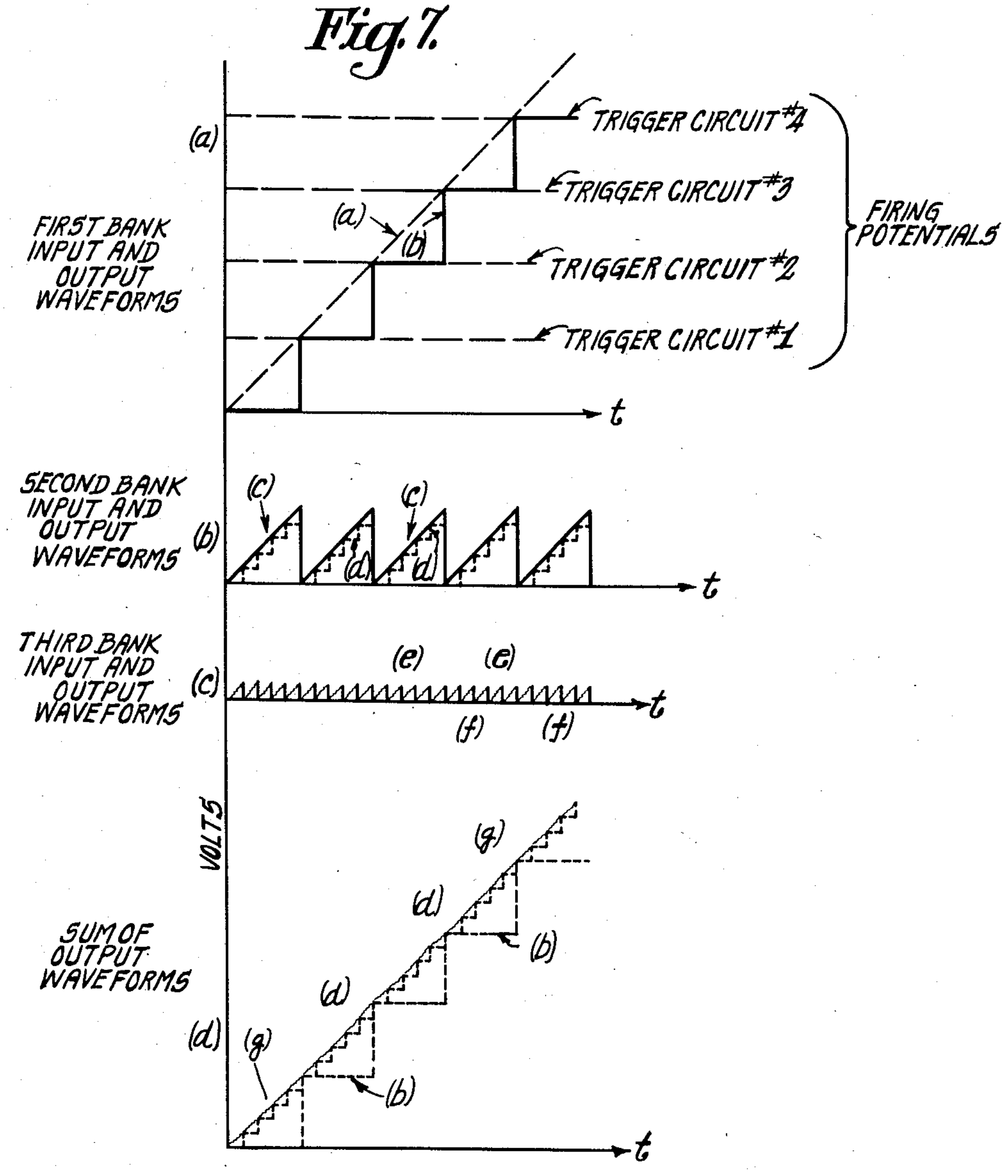

Explanation of system operation is made by reference to Figure 7, showing waveforms at several points of the circuit of Figure 6 identified by corresponding letters.

The signal to be quantized, represented by waveform (*a*) Figure 7*a*, is impressed between the system input terminal 201 and a point of reference potential, and appears simultaneously at the inputs of the regenerative trigger circuits 203, 204, 205, 206 contained within the first regenerative trigger circuit bank 202. As the amplitude-varying input signal progressively increases in value above the respective firing potentials represented in Figure 7*a*, the regenerative trigger devices will change from their original stable state to their second stable state of conduction, the output signals resulting being combined in the first bank combining network 207. The quantized output from this combining network 207 is represented by waveform (*b*) of Figure 7*a*. This quantized output waveform is fed to the system output combining network 224, which operation will be discussed later in connection with Figure 7*d*. This first bank quantized output waveform is also fed to a first subtracter stage 208 which also receives the amplitude-varying input signal. The input and output signals are combined in this subtracter stage 208 and the difference signal, represented by waveform (*c*) of Figure 7*b*, is fed to the inputs of both the second regenerative trigger circuit bank 210 and the second subtracter stage 212. As the waveform ($c$) progressively increases in value it sequentially fires the trigger circuits composing the second regenerative trigger circuit bank 210, which is identical in makeup and operation to the first regenerative trigger circuit bank 202. The quantized output represented by waveform ($d$) of Figure 7$b$, is fed to the system output combining network 224, and also to the second subtracter stage 212. Waveform ($c$) and ($d$), the two input signals to the subtracter stage 212 are compared, and the difference voltage, represented by waveform ($e$) of Figure 7$c$ is fed to the third regenerative trigger circuit bank 214 and its associated subtracter stage 216. Input waveform ($e$) is similarly quantized in the third regenerative trigger circuit bank 214 and the output is represented by waveform ($f$) of Figure 7$c$ which is fed to the system output combining network 224. Similarly, input and output waveforms are also compared in the subtracter circuit 216 and the difference voltage fed to the next subsequent regenerative trigger circuit bank-subtracter loop. This operation continues thru the $n$th regenerative trigger circuit bank 220 which quantizes the difference waveform fed to it by the previous subtracter stage, and the quantized output waveform from this stage is fed to the output combining network 224. As previously described, the quantized signal output of each regenerative trigger circuit bank is fed to the output combining network 224. There, each signal is added, the resultant combination signal appearing at system output terminal 226, represented by waveform ($g$) of Figure 7$d$. This figure graphically illustrates the combination of the quantized output signals of a quantizing system employing three regenerative trigger banks, each employing four regenerative trigger circuits. Utilization of twelve such trigger circuits in the embodiment described in connection with Figures 1 or 3 would yield $(M+1)$ or thirteen levels. In the instant embodiment twelve such circuits yield $(M+1)$ $(N+1)$ $(Q+1)$ or (5 x 5 x 5), a total of 125 levels.

Figure 8 is a basic block diagram teaching the principles of this invention in an alternate embodiment wherein $M+N \ldots +Q$ regenerative trigger circuits provide a system output signal containing $(M+1)$ $(N+1) \ldots (Q+1)$ levels. In the circuitry illustrated, four regenerative trigger circuits are utilized in each of the four banks shown. For these 16 regenerative trigger circuits it is possible to obtain a quantized output signal of $(4+1)^4$ or 625 levels. Any number of regenerative trigger circuits may be used in each bank, and any number of banks may be employed, providing flexibility according to need.

An input terminal 301 connects to a subtracter stage 302, the output of which is connected to a main common bus 304. In its simplest form, a subtracter circuit consists of identical impedance or resistance elements between each of its input terminals and its output terminal, and an impedance or resistance between the output terminal and a point of reference potential, such as ground. An inverting element such as a tube or a transformer is employed in at least one of the input circuits in order that the signal appearing at the output terminal will be a difference voltage. As explained later, in the instant embodiment the output signals of the intermediate stages of the quantizing system are subtracted in this stage from the signal to be quantized, and the difference signal is applied to the inputs of each and every regenerative trigger circuit in the system via the common bus 304. A complete discussion of adder ad subtracter circuits, utilizing either vacuum tubes or passive networks, is found on pages 629 thru 648, "Waveforms," Chance et al., vol. 19, Radiation Laboratory Series, McGraw-Hill Book Co. Inc., 1949 edition.

The main common bus 304 connects to the input of each of the regenerative trigger circuits making up the totality of regenerative trigger circuit banks. Each regenerative trigger circuit may be identical in circuitry with that shown in Figures 5$a$ or 5$b$. The circuitry of each bank may be identical to that disclosed and previously described in conjunction with Figures 1 or 3. Determination of the trigger circuit firing potential differs, however. The trigger circuits of the first bank 306 are arranged to trigger or change their state of conduction progressively and in a sequential order at different values of input signal. The regenerative trigger circuits of all subsequent banks have an identical firing potential. Thus, the regenerative trigger circuits of all banks save the first may change from one stable state to their other stable state when the signal to be quantized appearing on the common bus 304 reaches a predetermined point above the operating range of the first bank of regenerative trigger devices 306. The amplitude of signal required to trigger the last regenerative trigger circuit 310 of the first bank 306, or the operating range of the first banks, shall be known as the N level, while the higher amplitude required to trigger all subsequent circuits shall be known as the $N+1$ level. Between each pair of banks is a gating matrix, a device to be later described, that determines when and which regenerative trigger circuit of the succeeding bank is allowed to respond to the excursions of the waveform to be quantized.

Each bank in the instant embodiment employs a five level (four regenerative trigger stages) quantizer, in order to enable a simplicity of explanation. Thus, the first regenerative trigger circuit bank 306 is composed of a first regenerative trigger circuit 307, a second regenerative trigger circuit 308, a third regenerative trigger circuit 309, and a fouth regenerative trigger circuit 310. The inputs are tied in parallel to the common bus 304 and the outputs from each regenerative trigger circuit are combined in the bank combining network 311. The output of the bank combining network 311 is coupled to the system output combining network 333. The circuitry of a combining network is identical to that of an adder network previously described and an excellent discussion may be found in vol. 19 of "Waveforms," cit. supra. The output of the system combining network 333 is tied to an output terminal 334, from which the quantized signal may be taken.

The output of the fourth and last of the regenerative trigger circuits 310 within the first regenerative trigger circuit bank 306 is connected to the input of a gating matrix stage 312. A gating matrix is a network composed of "and" and "or" gates, and its function is to direct signals to preselected output circuits in accordance with the number and position of signals energizing its input circuits. An "and" gate is one in which the output terminal is activated only if all the input terminals of the gate are activated. An "or" gate is one in which the output terminal is activated if any input terminal is activated. For a complete discussion of "and" and "or" gates and their applicability, reference is made to pages 217 thru 226, "The Design of Switching Circuits," Keister, Ritchie and Washburn, D. Van Nostrand and Co. Inc., first edition (1951). As will be discussed later, the function of each gating matrix in the instant embodiment is to determine when each of the regenerative trigger circuits in the subsequent trigger bank will be allowed to change from its original stable state of conduction to its second stable state, and vice-versa, in response to the excursions of the signal to be quantized as appearing on the common bus 304 appearing at the input of each regenerative trigger circuit.

This control function may be performed by the gating matrix in a variety of ways. The matrix output may be coupled to the cathode or emitter circuit of the regenerative trigger circuit. The matrix output may connect to an input electrode of one of the recipro-conductive elements of the trigger circuit. If multi-input electrode elements are used, the matrix output may connect to a different input element than that which receives the signal to be quantized. In each case, the matrix serves to prevent or allow trigger circuit operation in response to input signal excursions by effectively opening or closing the trigger circuit. For example, a blocking voltage may be applied to or removed from the electrode of the recipro-conductive element to which the matrix output is connected.

The output of the gating matrix 312 is connected via gating leads 353, 354, 355, 356, to the input of each of the regenerative trigger circuits in the second regenerative trigger circuit bank 313. They are identical in construction and operation with those of the first bank 306, except that they are identically arranged to trigger at a level slightly higher than the triggering level for trigger circuit 310. The second bank 313 comprises a first regenerative trigger circuit 314, a second regenerative trigger circuit 315, a third regenerative trigger circuit 316, and a fourth regenerative trigger circuit 317. The inputs of each are connected to the system common bus 304 while their outputs are connected to a second bank combining network 318. The output of this second bank network 318 is also coupled to the system output combining network 333. The connections of this second bank 313 differ from the first bank 306 in that the outputs of each of the regenerative trigger circuits are, besides being connected to the bank combining network 318, connected by means of respective leads 349, 351 to the input of the previous gating matrix 312, and by means of additional leads 350, 352 associated respectively with each trigger circuit, to the input of an adder stage 303. The output of said adder stage is connected to the originally mentioned subtracter stage 302. Additionally, each regenerative trigger circuit in this second bank 313 is biased to trigger at the $N+1$ level of input voltage. This adder stage 303 comprises a stage where the signals to its input may be combined. A typical structure is discussed in vol. 19 of "Waveforms," pages 629 thru 648 cit. supra.

The output of the fourth or last regenerative trigger circuit 317 of the second bank 313 is connected to the input of the subsequent or second gating matrix 319, the output of which is connected via gating leads to the inputs of each of the regenerative trigger circuits in the third or succeeding regenerative trigger bank 320. Thus gating leads are connected from the matrix 319 to the first regenerative trigger circuit 321, the second regenerative trigger circuit 322, the third regenerative trigger circuit 323, and the fourth regenerative trgiger circuit 324 of the third bank 320. These circuits are also identically biased to trigger at the $N+1$ level, their sequential order of firing being determined by the preceding gating matrix 319. The inputs of all the regenerative trigger circuits are connected to the common input bus 304 while the outputs connect to the third bank combining network 325, which in turn connects to the system output combining network 333. As in the previous regenerative trigger circuit bank 313, the output of each regenerative trigger circuit is fed to the input of the preceding gating matrix which for the third bank 320 is the second gating matrix 319. Each trigger circuit output is also connected to the adder stage 303.

In Figure 8, the output of the last regenerative trigger circuit 324 of the third bank 320 is fed to the subsequent or third gating matrix 326. The outputs of the matrix 326 are shown as being connected to the inputs of the regenerative trigger circuits in a fourth regenerative trigger circuit bank 327, but the dotted lines in said gating leads and the common bus 304 signify that any number of intermediate regenerative trigger circuit banks and associated gating matrixes similarly connected may be utilized. The inputs of the trigger circuits in the last bank 327 are connected to the common bus 304 while their outputs, namely, those of the first trigger circuit 328, the second trigger circuit 329, the third trigger circuit 330 and the fourth trigger circuit 331 are connected to the fourth bank combining network 332, the preceding gating matrix 326 and the adder stage 303. The output of the fourth bank combining network 332 is similarly connected to the system output combining network 333. The trigger circuits of the fourth or last bank shown are also identically biased to trigger at the $N+1$ level.

Operation of the system of Figure 8 may best be explained by reference to Figures 9*a* thru 9*f*, charts of the voltage waveforms at various points of the system of Figure 8. Identical symbols appear on the several waveforms and at the corresponding leads of the system where the waveforms appear.

A continuously amplitude varying signal waveform to be quantized, represented in Figure 9*a* by waveform (*a*), is impressed between the input terminal 301 and a point of reference potential, in this case ground. Although the system illustrated here will work particularly well on arbitrary signals, for purposes of illustration the signal to be quantized will be assumed to be a sawtooth rapidly increasing in value at a linear rate. This signal is passed thru the subtracter stage 302, and since there is as yet no output signal from the intermediate stages of the quantizing system, this signal appears unchanged on the common input bus 304. The first bank of regenerative trigger circuits 306 is adjusted so that the individual trigger circuits fire sequentially as the input waveform increases in the manner described in connection with Figures 1 and 2, or Figures 3 and 4. The initial portion of the input waveform (*a*) which represents the operating range of the first bank of regenerative trigger circuits 306 is indicated on Figures 9*a* and 9*b* by the designator ($x_1$) and ($x_1'$), respectively. As the input waveform increases in value over time $t_1$, indicated by ($x_1$), the correspondingly rising waveform on the common bus 304 appearing at point (*b*) of Figure 8, will cause the regenerative trigger devices to change from their first stable to their second stable conductive states in a sequential fashion. The output waveforms of the first bank 306 are combined in the bank combining network 311 and the quantized output corresponding to the excursion of waveform (*a*) over range ($x_1$) is represented by waveform (*c*) of Figure 9*c*.

When the input signal increases beyond the N level, the value necessary to cause the last regenerative trigger circuit 310 of the first regenerative trigger bank 306 to change to its second stable state of conduction, the first bank 306 is no longer capable of quantizing. The N level is indicated on the waveform pictured in Figure 9*a*. However, when the input signal to be quantized (*a*) has increased a sufficient amount beyond the operating range of the first bank 306, this point being represented by the $N+1$ level of Figure 9a, the gating matrix stage 312 allows the first regenerative trigger circuit 314 of the second bank 313 to change from its first stable to its second stable state of conduction. The output waveform of the first regenerative trigger circuit 314 of the second bank 313 is indicated by step (*y*) of waveform (*d*) of Figure 9*d*. This output waveform is simultaneously fed to the second bank combining network 318, the gating matrix 312 over lead 349, and the adder stage 303 over lead 350, accomplishing the following functions: the output of this first-second bank regenerative trigger circuit 314 is processed in the second bank combining network 318 and the system output combining network 333 so that the signal appearing at the system output terminal 334 assumes the same form as if there were an additional regenerative trigger circuit in the first bank 306; the signal fed to the gating matrix 312 enables the matrix to perform its control function of allowing the regenerative trigger circuits in the second bank 313 to respond to the excursions of the system input signal at the $N+1$ level as it appears on bus 304; additionally, the output waveform of trigger circuit 314 is fed over lead 350 to the adder stage 303 and then to the subtracter stage 302, where it is subtracted from the input signal to be quantized, waveform (*a*) of Figure 9*a*, returning the regenerative trigger circuits of the first trigger bank 306 to their original stable states so that they are once again capable of firing sequentially as the waveform continues to increase. This latter operation is graphically illustrated by the waveforms of Figure 9. Segment ($x_1$) of waveform ($a$) of Figure 9$a$ represents the initial excursion of the input waveform corresponding to the operating range of the first bank of regenerative trigger circuits 306. This waveform appearing on the bus 304 is represented by corresponding segment ($x_1'$) of waveform ($b$) of Figure 9$b$ which initially is identical in voltage range to the input signal. The quantized output of the first bank 306 is represented in Figure 9$c$. Level ($y$) of Figure 9$d$ indicates the output waveform of the first regenerative trigger circuit 314 of the second bank 313 during the excursions of the input waveform ($a$) between times $t_1$ and $t_2$, said segment of input waveform during said time interval being represented in Figure 9$a$ by the symbol ($x_2$). The level ($y$) has an amplitude or voltage value equal to the $N+1$ level of Figure 9$a$. The difference voltage representing the subtraction of the output of the first-second bank regenerative trigger circuit 314 from the input signal in the subtracter stage 302, is represented by waveform ($x_2'$) of Figure 9$b$. Waveform ($x_2'$) is identical in shape with waveform ($x_1'$) and thus is within the amplitude-handling capabilities of the first regenerative trigger circuit bank 306. The step waveform ($f$) of Figure 9$f$ at the time during which only the first regenerative trigger circuit 314 of the second bank 313 is conducting in that bank is represented by corresponding segment ($x_2''$) of Figure 9$f$, a combination of the waveform outputs of the first bank combining network 311 and the second bank combining network 318 as they appear at the output terminal 334 of the system output combining network 333.

When segment $x_2$ of the input waveform has triggered all the circuits of the first bank 306 for the second time, the first gating matrix 312 allows the second regenerative trigger circuit 315 of the second bank 313 to change its state or fire in response to the input signal on the common bus when the signal reaches the ($N+1$) level, since the first-second bank circuit 314 is previously conducting in its second stable state. As with the first-second bank regenerative trigger circuit 314, the output of the second-second bank regenerative trigger circuit 315 is fed to the system output combining network 333 thru the second bank combining network 318, as well as to the first gating matrix stage 312 over lead 351, and to the adder stage 303 over lead 352 where it is added to the output of the first-second bank regenerative trigger circuit 314, so that the sum of the two second bank outputs is now subtracted from the original input signal waveform in the subtracter stage 302. The combination of these outputs in the adder stage 303 is represented in Figure 9$d$ by level ($z$) of waveform ($d$) while the difference voltage appearing on common bus 304 after the subtraction of this combination from the input signal is represented by segment ($x_3'$) of waveform ($b$) of Figure 9$b$. Level ($z$) has a voltage level equal to twice the voltage level of $N+1$. Thus, the signal at the common bus 304 is once again reduced to a range where the first bank regenerative trigger circuits 306 are capable of operation. As the waveform ($a$) of Figure 9$a$ continues to increase, the third regenerative trigger circuit 316 and the fourth regenerative trigger circuit 317 of the second bank 313 are similarly actuated and their outputs combined in a similar manner.

Similarly, when the last regenerative trigger circuit 317 of the second regenerative trigger bank 313 has been fired, its output is fed to the second or successive gating matrix 319 and causes the gating matrix 319 to operate in such fashion that it allows the first-third bank regenerative trigger circuit 321 to change its state of conduction when the input signal ($b$) on the common bus 304 reaches the $N+1$ level. The effect of the firing of the first third-bank regenerative trigger circuit 321 is illustrated by waveform ($e$) of Figure 9$e$. The amplitude or voltage level ($w$) of waveform ($e$) is equal to ($M+1$) times the ($N+1$) level, where M is the number of regenerative trigger circuits in the second bank. For this example M is equal to four, therefore the voltage level ($w$) is equal to five times the ($N+1$) level. The output of the first third-bank regenerative trigger circuit 321, beside being fed to the system output combining network 333, combines with the output signals of all the preceding circuits in the system in the adder stage 303, and the sum is then subtracted from the constantly increasing input signal in the subtracter stage 302 in order that the excursions of the difference waveform ($b$) of Figure 9$b$ appearing on the common bus 304 will remain within the operating range of the first regenerative trigger circuit bank 306, and if the input signal ($a$) should continue to rise, the second-third bank regenerative trigger circuit 322 will change from its first stable to its second stable state with a resulting increase in the number of quantized steps appearing at the system output terminal 334.

The pattern of operation described above will continue as waveform ($a$) of Figure 9$a$ continues to rise, the only limitation being that the signal handling capabilities of the entire system must be equal to the total peak-to-peak variations of the input signal to be quantized, if it is desired to obtain quantizing over the entire input signal range. Figure 9$f$ shows the waveform appearing at the system output terminal 334, where ($f$) designates the output waveform. The outputs of the system regenerative trigger banks which made up this waveform due to combination in the system output combining network 333 are also illustrated by dotted lines. Thus for a portion of the input signal to be quantized ($a$), its quantized counterpart ($f$) appearing at system output terminal 334 may be represented at arbitrary time $t_x$ as being composed of the output ($c$) of the first two regenerative trigger circuits of the first regenerative trigger circuit bank 306, the output ($d$) of the first regenerative trigger circuit 314 of the second trigger circuit bank 313, and the output ($e$) of the first regenerative trigger circuit 321 of the third regenerative trigger circuit bank 320.

It is seen that since the system can be extended to include any number of regenerative trigger circuits in each stage, and to include any number of stages, a numbering system of arbitrarily chosen radix may be simulated. The system illustrated in Figure 8 is based on a radix of 5. For a system of tens, each trigger circuit bank would have 9 stages yielding ten levels. The first bank output would correspond to digits zero thru 9; the second bank output would represent tens; the third bank output hundreds; the fourth bank output thousands, etc. With any radix chosen, the system output signal will contain a number of levels that is the extended product of one plus the regenerative trigger circuits in each bank, whereas the total number of stages employed is equal to their sum. The system output signal will contain ($M+1$) ($N+1$) . . . ($Q+1$) levels while the system employs $M+N$ . . . $+Q$ regenerative trigger circuits.

Reference is made to Figure 10, a block diagram of a Pulse Code Modulation System. A Pulse Code Modulation System is understood to mean a system that permits the conversion of a continuously varying wave into quantized samples that may be translated into a more appropriate code for transmission over the channel selected. It is the function of the quantizing systems of the instant invention to prepare continuously varying signal samples for coding prior to utilization. Such quantizing permits signal transmission by codes as used in telegraph systems, with the major advantage of improved noise immunity.

In Figure 10, the signal source 401, by way of example, may be a microphone or a video camera. A continuously varying waveform is fed from the output of the signal source 401 to a quantizing system 404 which may be of the form of any of the embodiments described previously, and in the manner thus described, the continuously varying waveform is converted to one restricted in form to predetermined discrete levels. The quantized signal output of the quantizer 404 is then in a form making it possible to ascribe a specified code group for each discrete level of output signal in accordance with the principles of Pulse Code Modulation. The output of the quantizer 404 is fed to the Pulse Code Modulator 406 where this coding takes place. For example, a usual application would entail representing each level as a succession of binary digits. The Pulse Code Modulator 406 when utilized in this fashion may be viewed as a device producing a pulse signifying a one, or the absence of a pulse signifying a zero. This succession of binary pulses is then fed to terminal equipment 408 for processing and retransmission over a microwave relay or coaxial cable system or any other convenient form of transmission. Discussion of Pulse Code Modulation and embodiments utilizing quantization will be found in chapter 19, Pulse Code Modulation, pages 299 thru 327 of the book, "Modulation Theory," Harold S. Black, 1953 edition, D. Van Nostrand Co. Inc. The use of any of the quantizing systems disclosed herein for preparation of a signal for coding is not limited to a Pulse Code Modulation System as shown by Figure 10, but such quantizing systems may be used with a Pulse Width Modulator, a Pulse Position Modulator, or any combination thereof.

This invention has been successfully employed for quantizing video television signals. The improved quantizing systems disclosed herein will perform equally well in any application requiring the conversion of a continuously varying signal (analog type information) to one composed of a set of finite values (digital type information). Because of this property, the instant invention may also be successfully utilized in telemetering and computing systems.

What is claimed is:

1. A quantizing system comprising a plurality of value-controlled Schmitt trigger circuits each having a single input, means connecting the inputs of all of said trigger circuits in electrically parallel relation, means coupling an input signal to be quantized to the inputs of said trigger circuits through a single-ended coupling, means enabling said trigger circuits to respectively change their states of conduction at different values of input signal, and means for combining the outputs of all of said trigger circuits to form a quantized system output signal.

2. A quantizing system comprising a plurality of value-controlled Schmitt trigger circuits, each having a single input, means connecting the inputs of all of said trigger circuits in electrically parallel relation, a variable gain amplifier, means coupling an input signal to be quantized to said amplifier, said amplifier adjusting the peak-to-peak excursions of said input signal to equal the total predetermined range over which said trigger circuits will change from one stable state to the other, means coupling the output of said amplifier to the inputs of said trigger circuits through a single-ended coupling, means enabling said trigger circuits to respectively change their states of conduction at different values of input signal, and means for combining the outputs of all of said trigger circuits to form a quantized system output signal.

3. A quantizing system comprising a plurality of value-controlled regenerative trigger circuits capable of assuming either of two stable states of conduction, means connecting the inputs of all of said trigger circuits in parallel, a variable gain amplifier, means supplying an input signal of varying amplitude to be quantized to said amplifier, means differently biasing said trigger circuits to enable changes of their states of conduction at progressively different levels of input signal, said amplifier adjusting the peak-to-peak excursions of said input signal to equal the total predetermined range over which said trigger circuits will change from one to the other stable state of conduction, and vice-versa, means coupling the output of said amplifier to the inputs of said trigger circuits, and means for combining the outputs of all of said trigger circuits to form a system output signal composed only of predetermined steps formed by the combination of outputs of said trigger circuits operating in either of their stable states of conduction.

4. A system for quantizing a varying input wave comprising a plurality of value-controlled regenerative trigger circuits capable of assuming either of two stable states of conduction dependent upon the value of the wave impressed upon their input, a plurality of means corresponding in number to the number of trigger circuits for adding a direct current component of arbitrary value to the alternating current component of the system input wave, means serially connecting each of said D. C. adding means to a corresponding regenerative trigger circuit, means connecting the inputs of all of said D. C. adding means in electrically parallel relation, means for adjusting said D. C. adding means to progressively different arbitrary values thereby causing each regenerative trigger circuit to change from one stable state to another at progressively different points on the input wave, a variable gain amplifier, means coupling the system input wave to be quantized to said amplifier, said amplifier adjusting the peak-to-peak excursions of said input wave to equal the total predetermined range over which said trigger circuits will change from one to the other of their respective stable states of conduction, and vice versa, means coupling the output of said amplifier to the inputs of said D. C. adding means, and means for combining the outputs of all said trigger circuits to form a quantized output wave.

5. A system as defined in claim 4 wherein said trigger circuits include vacuum tubes connected as recipro-conductive elements.

6. A system as defined in claim 4, wherein said trigger circuits include transistors connected as reciproconductive elements.

7. A quantizing system comprising a plurality of banks of value-controlled regenerative trigger circuits, each bank including at least one such regenerative trigger circuit, said trigger circuits within each bank being capable of operating in either of two stable states; means for applying a signal to be quantized to the input of the first bank of said regenerative trigger circuits, means for subtractively combining the output waveform of each trigger circuit bank and the input waveform to the same trigger circuit bank, means for arranging said plurality of trigger circuit banks in sequence and for feeding the output waveform from each subtractive combining means respectively to the input of the next succeeding bank of trigger circuits in such sequence, and means for combining the output waveforms of all of said plurality of banks of trigger circuits to form a quantized system output waveform.

8. A quantizing system comprising a plurality of banks of value-controlled regenerative trigger circuits, each bank including at least one such regenerative trigger circuit, said trigger circuits within each bank being capable of operating in either of two stable states; means connecting the inputs of said trigger circuits within each bank in parallel, means directing the outputs of said trigger circuits within each bank to a bank combining means, means for applying a waveform to be quantized to the input of the first of said plurality of trigger circuit banks, means for subtractively combining the output waveform of each of said trigger circuit banks and the input waveform to the same bank, means for arranging said banks of trigger circuits in a sequence and for directing the output waveform of each subtractive combining means respectively to the input of the next succeeding bank of trigger circuits in such sequence, and means for combining the output waveforms of all of said bank combining means to form a quantized system output waveform.

9. A system for translating electrical waves which vary in amplitude and over a wide range of frequencies into a waveform composed only of levels made up of combinations of predetermined discrete steps comprising a plurality of banks of value-controlled regenerative trigger circuits capable of assuming either of two stable states of conduction, said trigger circuits being composed of recipro-conductive elements connected by regenerative cross-coupling means capable of passing direct current, means connecting the inputs of said trigger circuits within each bank in parallel, means biasing said trigger circuits within each bank to enable changes of their states of conduction at progressively different amplitude levels of input wave and in a sequential order, means directing the outputs of said trigger circuits within each bank to a bank combining means, means for applying a waveform to be quantized to the input of the first of said plurality of trigger circuit banks, means for subtractively combining the output waveform of each of said trigger circuit banks and the input waveform to the same bank, means for arranging said banks of trigger circuits in a sequence and for directing the output waveform of each subtractive combining means respectively to the input of the next succeeding bank of trigger circuits in such sequence, and means for combining the output waveforms of all of said bank combining means to form a quantized system output waveform.

10. A quantizing system comprising a plurality of banks of value-controlled regenerative trigger circuits arranged in a sequence, a common conductor, means including a subtracter stage coupling the signal to be quantized to said common conductor, said common conductor connecting in parallel relation the input terminals of all of said regenerative trigger circuits; means directing the outputs of said trigger circuits within each bank to a bank combining means, a gating matrix located between each pair of trigger circuit banks, each matrix having its input connected to the output of the last regenerative trigger circuit of the preceding trigger circuit bank and also to the outputs of all of the trigger circuits in the succeeding bank, each said gating matrix having an output connected to a gating connection in each of the trigger circuits in the succeeding bank, said gating matrix determining the time and order of the operation of the regenerative trigger circuits in the bank succeeding each matrix, an adder stage connected to the outputs of all of the regenerative trigger circuits except those in the first bank for combining their signal outputs, means connecting said adder stage to said subtracter stage, said subtracter stage subtractively combining the adder stage output signal with the signal to be quantized, and a system output combining means receiving and combining the output signals from each of said bank combining means to form a quantized output waveform composed only of levels made up of a combination of predetermined discrete steps.

11. A quantizing system comprising a plurality of banks of value-controlled regenerative trigger circuits capable of assuming either of two stable states of conduction, said trigger circuits being arranged in a sequence within each of said banks, said trigger circuits within the first of said banks being arranged to change from one stable state to the other stable state at progressively different values of input wave, the trigger circuits within all subsequent banks being arranged to change from one to the other stable state at an identical value of input wave beyond the range of the first bank trigger circuits, a common conductor connecting in parallel the inputs of all of said regenerative trigger circuits, means including a subtracter stage coupling the input signal to be quantized to said common conductor; means directing the outputs of said trigger circuits within each bank to a bank combining means, a gating matrix located between each pair of trigger circuit banks, each matrix having its input connected to the output of the last regenerative trigger circuit of the preceding trigger circuit bank and also to the output of each of the trigger circuits in the succeeding bank, each said gating matrix having its output connected to a gating connection in each of the trigger circuits in the succeeding bank, said gating matrixes determining the time and order of the operation of the trigger circuits in the trigger circuit bank succeeding said matrix, an adder stage connected to the outputs of all of the trigger circuits except those in the first bank for combining their signal outputs, means connecting said adder stage to said subtracter stage, said subtracter stage subtractively combining the adder stage output signal with the signal to be quantized, and a system output combining means receiving and combining the output signals from each of said bank combining means to form a quantized output waveform composed only of levels made up of a combination of predetermined discrete steps.

12. In a television transmission system, a quantizing system comprising a plurality of value-controlled Schmitt trigger circuits each having a single input, means connecting the inputs of all of said trigger circuits in electrically parallel relation, means coupling a composite video signal to the inputs of said trigger circuits through a single-ended coupling, means enabling said trigger circuits to respectively change their states of conduction at different values of said composite video signal, means for combining the outputs of all of said trigger circuits to form a quantized output video signal, a television transmitter, and means for modulating said transmitter by the quantized output video signal.

References Cited in the file of this patent

UNITED STATES PATENTS

| | | |
|---|---|---|
| 2,325,366 | Brown | July 27, 1943 |
| 2,693,593 | Crosman | Nov. 2, 1954 |
| 2,714,704 | Morrison | Aug. 2, 1955 |